United States Patent [19]

Marmet

[11] Patent Number: 4,491,726

[45] Date of Patent: Jan. 1, 1985

[54] INFORMATION DATA PROCESSING AND AUDIO MESSAGE DELIVERING SYSTEM

[75] Inventor: Yves Marmet, St. Lambert, Canada

[73] Assignee: Cossette & Associes, Quebec, Canada

[21] Appl. No.: 447,116

[22] Filed: Dec. 6, 1982

[51] Int. Cl.³ .................... G06K 7/10

[52] U.S. Cl. .................... 235/458; 235/381; 235/383

[58] Field of Search .................... 235/381, 383, 458; 369/30, 65, 98

[56] References Cited

U.S. PATENT DOCUMENTS 4,445,147 4/1984 Kessman .................... 369/30

*Primary Examiner*—Harold I. Pitts

*Attorney, Agent, or Firm*—Swabey, Mitchell, Houle, Marcoux & Sher

[57] ABSTRACT

The invention relates to an information data processing and audio message delivering system useful as a promotional feature to attract customers by housing same into an appealing body exhibiting a pleasant and sympathetic character. The information data are registered on a punch card or ticket which is introduced into a reading circuit that generates signals representative of each read information data. These signals are stored in a memory and latching circuit to feed a period validation circuit which defines the time period within which the punch ticket may be used. A further validation circuit is provided to validate a prize granted to a ticket holder, in accordance with related data registered on the punch ticket. Whenever a ticket is declared valid in all respects, an audio message recorded on a multi-track magnetic tape is sensed by a tape reading device which is properly directed a selected track of the tape by means of a logic and a track selecting circuit so as to deliver the right audio message corresponding to the information data registered on a given punch ticket.

11 Claims, 3 Drawing Figures

INFORMATION DATA PROCESSING AND AUDIO MESSAGE DELIVERING SYSTEM

BACKGROUND OF THE INVENTION

The present invention relates to a system for processing information data registered on a punch card and for delivering an audio message in relationship with those registered data. The present data processing and audio message delivering system is particularly useful as a promotional feature to undertake a local commercial promotion for specific items offered by retailers or public organizations such as in restaurants, shops, stores, entertainment parks or grounds, and so on.

For such a purpose, in order to attract customers, the system may be housed in an appealing body which may exhibit a pleasant personage, figure or individual such as a robot, clown or any other characters which are attractive or sympathetic to the general public. During the promotional campaign, punch cards or tickets are offered to customers who then insert them into a slot provided in the mechanical body to hear from the latter the actual prizes or discount value granted on a specific promotional item. That prize or discount value awarded is in fact determined by the position of the punch hole on the ticket, which information data is read by the processing system when such ticket is inserted into the machine slot and then an audio message is delivered to the customer to announce the prize won. That audio message is indeed issued from a multi-track magnetic tape reader prerecorded accordingly. Particular care is to exercised against forgery of tickets, on the one hand, and for restricting the use of such tickets outside the time period within which items are being promoted. Therefore, validation means have been devised within the system to prevent any abuse and to control efficiently the amount of prizes to be given out during the promotion period.

SUMMARY OF THE INVENTION

Therefore, the present invention is directed to a novel system capable of processing information data registered on punch tickets and for emitting audio messages corresponding to the position of the punch holes provided on the ticket.

A feature of the data processing and audio message delivering system of the present invention resides in its capability of validating the pertinency of the information data in order to prevent any forgery and to conform the use of such tickets within a predetermined time period.

The present invention generally relates to a system for processing information data registered on a punched ticket and for delivering an audio message in accordance with said data, the system comprising means for reading said information data from said punch ticket and for issuing signals representative of each read information data; memory means for storing and for latching each signal received from said reading means; first validation means for validating a first set of data signals received from said reading means; a second validation means for comparing a second set of data signals received from said memory means to a predetermined data value; a multi-track tape reading device; means connected to said first validation means, to said second validation means and to said memory means for directing said tape reading device to a selected track of said multi-track tape; and an electromagnetic means connected to said tape reading device for audibly delivering a message recorded on the selected track from said multi-track tape.

A preferred embodiment of the present invention resides in the fact that two series of data are punched on the ticket in two separate rows so that the first validation means performs validation of the data registered in the first row whereas the second validation means validates those included in the second row.

Another preferred embodiment of the present invention consists in optically assessing the presence or absence of punch holes and their position on the ticket through the use of light emitting diodes coupled to photo-transistors.

An additional preferred embodiment of the present invention resides in the fact that, following the delivery of each audio message, a tone signal is used to stop the tape reading device and to reset the memory and latching means as well as the validation means so that the data recorded on a subsequent ticket may then be processed.

BRIEF DESCRIPTION OF THE DRAWINGS

Preferred embodiments of the present invention will hereinafter be described with reference to the accompanying drawings wherein.

DESCRIPTION OF THE PREFERRED EMBODIMENT

Figure 1:
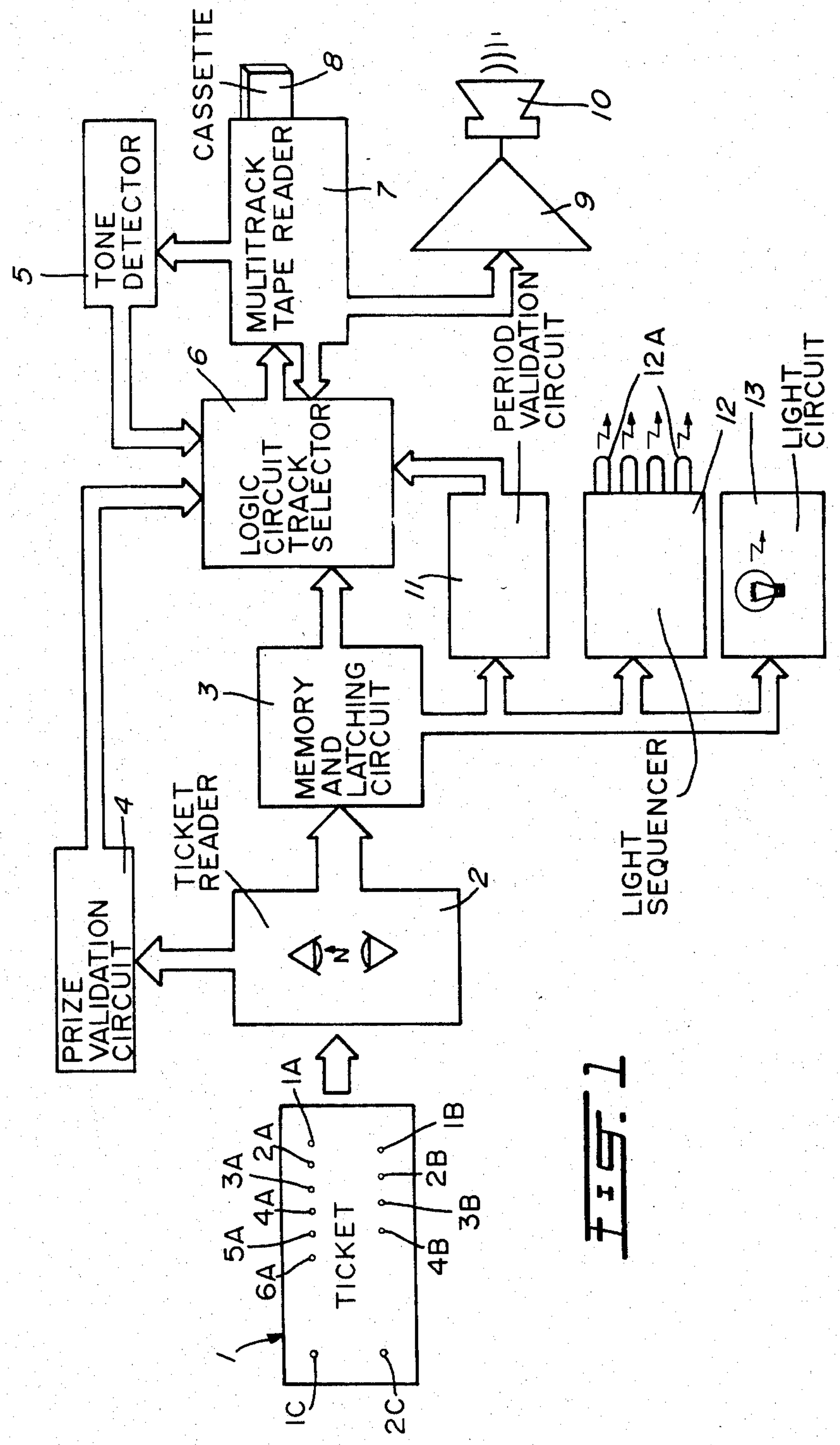
FIG. 1 is a block diagram showing the information data processing and audio message delivering system in accordance with the present invention.

Referring to FIG. 1, there is illustrated a block diagram of the various devices or circuits forming an embodiment of the present system capable of processing the information data provided on a punch card or ticket 1 so that a specific prerecorded message from a multi-track tape enclosed in a cartridge 8 be audibly delivered through a speaker 10. The punch ticket bears one or a series of holes positioned along two rows set in parallel. Hole positions 1A to 6A are concerned with the type of prizes granted to a ticket holder. each of these punch holes corresponding to one specific prize which will be given out and advertised from one specific track selected from the multi-track tape 8. Therefore, only one punch hole among a selection of eight holes where an 8-track tape is used has to be punched in order to be valid and the position of that punch hole will determine the prize granted. The second series of punch hole positions 1B to 4B relate each to the time period during which a given ticket is available for prizes. Here again, only one hole has to be punched among the four possibilities indicated and the position of that hole will determine the validity of the prize granted during the period considered. Assuming the validity period runs by weeks, the punch mark 1B will indicate that the ticket has to be used within the first week in order to be valid, whereas hole 2B covers the second week, 3B the third week and 4B the fourth week. Therefore, when a ticket bearing a punch hole at position 1B is inserted into the system during the second promotion week, the ticket will be rejected as invalid by the system since covering an obsolete period. This arrangement allows the promoter to control adequately the number of prizes granted during a definite time period and thus to govern better the promotion costs. As to hole positions 1C and 2C, they serve to determine the validity of the ticket itself since only a punch hole at position 1C must appear on the ticket for its validation and the presence of a hole at position 2C will readily invalidate same.

Ticket 1 is introduced into a ticket reader 2 which optically senses the position of the various punch holes registered thereon and delivers appropriate signals to the prize validation circuit 4 and to a memory and latching circuit 3. The function of the prize validation circuit is to check the validity of the hole punched among the series 1A to 6A so as to prevent against any forgery as to the prize value granted. In this instance, whenever two punch holes or more are detected by the ticket reader, the prize validation circuit 4 will readily reject the ticket and thus no granting of any prizes will be awarded to the ticket holder.

All signals collected by the ticket reader 2 are forwarded to the memory and latching circuitry which stores all collected data on a temporary basis until the complete delivery of the audio message by the system. On the other hand, the latching action of circuit 3 avoids any further storing of data collected from any subsequent ticket by the ticket reader 2 where information read from a previous ticket is still under process through the system. Part of the data memorized by circuit 3 is forwarded to a period validation circuit 11 which determines whether the position of the punch hole among the series 1B to 4B on the ticket 1 corresponds to a valid period of use of that ticket by comparing that data to a period data preselected in the circuit 11. According to the signals received from the prize validation circuit 4 and from the period validation circuit 11, the logic circuit and track selecting circuit 6 will determine which track is to be selected by the multi-track tape reader 7 on the magnetic tape 8 so as to read the proper recorded message corresponding to the information as to the prize granted in relation with the hole punched in series 1A to 6A on ticket 1. The message recorded on tape 8 is then read by the tape reader 7, amplified through amplifier 9 and delivered by the speaker 10. At the end of each message recorded on each track of tape 8, a tone signal is prerecorded to indicate that such message has been completely delivered. That tone signal is forwarded to a tone detector 5 for stopping the reading of the tape and to reset the whole system through the logic circuit 6.

The signal provided from the memory circuit 3 may also be used to initiate accessory elements such as lightbulbs, visual indicators and so on, to catch the customers' eyes by producing pleasant effects. Thus, a light sequencer 13 may be used for energizing in sequence a plurality of light emitting diodes 12 as well as a light energizing circuit to control one or several bulbs.

Figure 2:
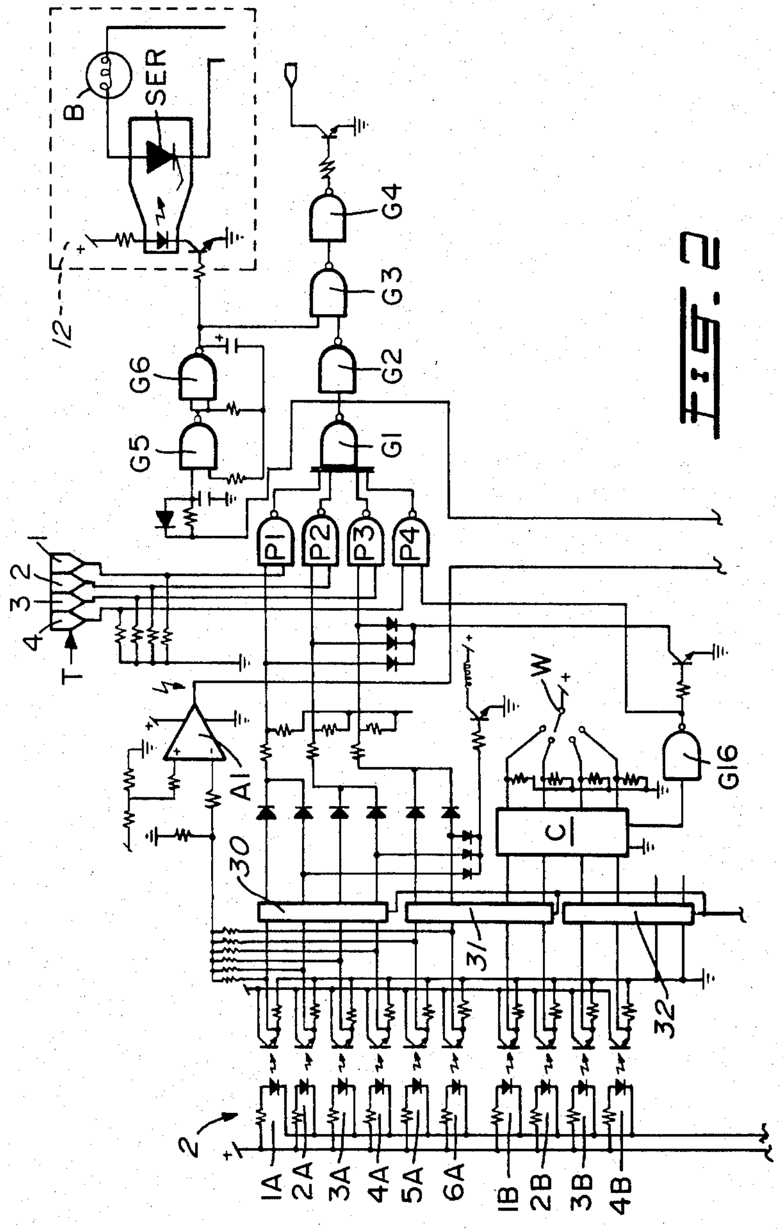
FIGS. 2 and 2*a* are schematics showing the various components of the system illustrated in FIG. 1
Figure 2A:
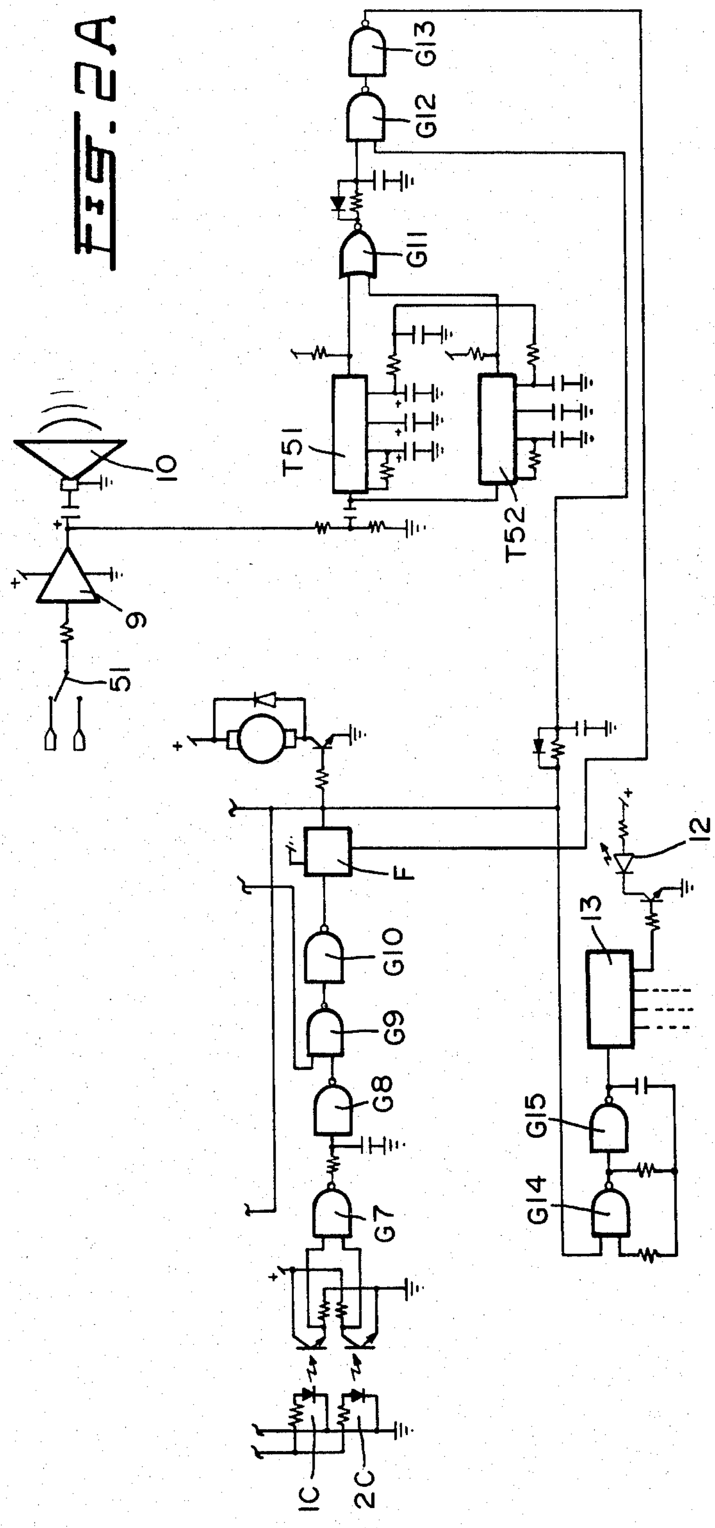

FIGS. 2 and 2*a* show in detail how the information data and audio message delivering system illustrated in blocks diagram in FIG. 1 is implemented. The ticket reader 2 is made up of a series of twelve optical detectors suitably set so as to sense and determine the position of the holes punched in ticket 2. Each detector is formed of a light emitting diode coupled to a phototransistor in a known manner. Detectors 1A to 6A correspond individually to the series of holes 1A to 6A provided on ticket 1 and are concerned each with a specific prize or message recorded on the multi-track magnetic tape associated with a given ticket. Detectors 1B to 4B are associated with the series of holes 1B to 4B on ticket 1 and are relative to the valid time period during which the ticket may be used whereas detectors 1C and 2C are disposed in registry with hole positions 1C and 2C on ticket 1 in order to determine the validity of the ticket itself. All signals produced by the phototransistors of detectors 1A to 6A and 1B to 4B are forwarded and stored into the storing and latcing elements 30, 31 or 32 of the memory circuit 3. As mentioned previously, a single signal alone is to be detected by detector 1A to 6A to validate the prize granted. If more than one signal is actually detected, then the operational amplifier A1 which is part of the validation circuit 4 of FIG. 1 will be turned on to generate a signal to the NAND gates G9 and G10 that will deliver a logic "0" to flip-flop F and thus will prevent the starting of motor M of the tape reader 7 (FIG. 1) and also to reset readily the system by clearing the storing elements 30, 31 and 32. On the other hand, when a valid signal is detected by detectors 1A to 6A, a pulse is generated towards the logic gates P1, P2 or P3 and therefrom to the track selector 4 through the NAND gates G1, G2, G3, G4, G5, G6 which function to position the reading head of the tape reader 7 onto the right track in order to effectively read the correct message associated to the signal detected by one of detectors 1A to 6A. The logic gate G4 serves to energize K11 associated with the reading head of the tape reader. It is to be noted that the number of tracks usually available from a standard tape cartridge is eight, which is four tracks on each side of the tape. Thus, the signal conveyed from detectors 2A, 4A and 6A also serves to energize coil R1 connected to switch S1 so as to select the proper tape side with respect to those incoming signals. Therefore, through the present embodiment if a punch hole in ticket 1 is detected by detector 1A, the signal delivered by the corresponding photo-transistor will be stored in the latch element 30 to select track number 1, for instance, on the magnetic tape 8 by the tape reader 7. Once selected, the message recorded on the track is sensed by the tape reading head and amplified by the amplifier 9 to trigger the speaker 10.

Detectors 1B to 4B are used to validate the time period during which the ticket is to be used by the holder. Here again only one signal is to be sensed by either one of the detectors 1B to 4B to provide a valid time period. Moreover, the sensed signal will be compared within comparator C to a period value determined by means of selector W. If the comparison result is positive, the system will then proceed as described before, but in the event of a negative comparison result, a signal will be forwarded to gate P4 through gate G16 to position the reading head of reader 11 to a given tape track for delivering an audio message pointing out that such ticket is not a valid one. Similarly, if two punch holes are sensed by detectors 1B to 4B, the same audio message will be delivered through reader 11.

Concerning detectors 1C and 2C, the signals generated by their respective photo-transistors indicate the validity of the punch ticket itself since only a signal from 1C must be forwarded to render the system operational. When both signals are sensed, then the flip-flop F will be energized through the logic gates G7 to G10 so as to prevent the starting of the tape reader motor M and for resetting the whole system by producing an action similar to that initiated by the operational amplifier A1 of the prize validation circuit 4.

At the end of each message recorded on the tape, a double tone signal is conveyed through the audio circuitry and forwarded to the tone detector 5 connected to the output of amplifier 9. That tone detector 5 is constituted of two tone detecting circuits TS1 and TS2 the output signals of which are used to trigger flip-flop F through the NOR gate G11 and the NAND gates G12 and G13 to reset the processing system.

Whenever a ticket is found valid, auxiliary circuits are actuated, these circuits include the sequencer 13 which is initiated through the logic gates G14 and G15 and serves to sequentially turn on a number of light emitting diodes 12 and another circuit incorporating a lightbulb B which is fed by an oscillator and intermittently turn on and off by means of a photo-thyristor SCR.

It is understood from the above that the ambit of the invention is not limited to the embodiments described but that any variation therefrom whether contemplated or not which falls within the scope of the claims is part thereof.

I claim:

1. A system for processing information data registered on a punch ticket and for delivering an audio message, comprising:

means for reading said information data from said punch ticket and for issuing signals representative of each of said read information data;

memory means for storing and for latching each signal received from said reading means;

first validation means for validating a first set of data signals received from said reading means;

second validation for comparing a second set of data signals received from said memory means to a predetermined data value;

a multi-track tape reading device;

means connected to said first and second validation means, to said second validation means and to said memory means for directing said tape reading device to a selected track of said multi-track tape; and an electro-magnetic means connected to said tape reading device for audibly delivering a message recorded on the selected track from said multi-track tape.

2. A system as claimed in claim 1, wherein said reading means comprises means for detecting the position of punch holes provided among said first and second set of data registered on said ticket.

3. A system as claimed in claim 2, wherein said detecting means comprise light emitting diodes coupled to photo-transistors.

4. A system as claimed in claim 1, wherein said first validation means includes logic circuit means to inhibit operation of the system whenever more than one signal are issued by said reading means as comprised in said first set of data.

5. A system as claimed in claim 1, wherein said second validation means includes logic circuit means for delivering a non-validity message through the electro-magnetic means when the signal detected from said second set of data do not compare with said predetermined data value signal.

6. A system as claimed in claim 1, including a third validation means for assessing the validity of said punch ticket and for resetting the entire system whenever said validity is not asserted.

7. A system as claimed in claim 1, further including a tone detecting circuit for detecting an audio signal recorded at the end of each message and for resetting the whole system upon detection of said tone.

8. A system as claimed in claim 1, further including circuit means for sequentially turning on a series of light emitting elements, said circuit means being connected to said memory circuit through logic elements.

9. A system as claimed in claim 1, further including means for intermittently turning on one or more light elements by means of said memory means acting through appropriate logic elements.

10. A system as claimed in claim 1, wherein said electro-magnetic means comprises a speaker.

11. A system as claimed in claim 1, wherein the multi-track tape comprises an 8-track tape housed in a cartridge.

* * * * *